(12) United States Patent
Brown et al.

(10) Patent No.: US 10,678,490 B1
(45) Date of Patent: Jun. 9, 2020

(54) POLYHEDRAL DISPLAY DEVICE USING SHAPED FLAT-PANEL DISPLAYS

(71) Applicant: Rockwell Collins, Inc., Cedar Rapids, IA (US)

(72) Inventors: Todd M. Brown, Cedar Rapids, IA (US); Clayton Cale Stephens, Swisher, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/059,375

(22) Filed: Aug. 9, 2018

(51) Int. Cl.
| | | |
|---|---|---|
| *G06F 3/14* | (2006.01) | |
| *G06F 3/147* | (2006.01) | |
| *G09G 3/22* | (2006.01) | |
| *H04N 13/349* | (2018.01) | |
| *G02B 30/00* | (2020.01) | |
| *G06T 3/00* | (2006.01) | |

(52) U.S. Cl.
CPC .......... *G06F 3/1446* (2013.01); *G02B 30/00* (2020.01); *G06F 3/147* (2013.01); *G09G 3/22* (2013.01); *H04N 13/349* (2018.05); *G06T 3/005* (2013.01); *G09G 2300/026* (2013.01); *G09G 2310/0264* (2013.01); *G09G 2380/12* (2013.01)

(58) Field of Classification Search
CPC .... G06F 3/1446; G06F 3/04815; G06F 3/011; G06F 3/0488; G06F 3/04842; G06F 2203/04802; G09G 2300/026; G09G 2380/12; G09G 2340/0492; G02B 27/017; G02B 2027/0178; G02B 5/247; G02B 5/23293; H04N 5/247; H04N 5/23293
See application file for complete search history.

(56) References Cited

U.S. PATENT DOCUMENTS

| | | | | |
|---|---|---|---|---|
| 3,975,850 | A  * | 8/1976 | Giaume | G09F 7/18 406/10 |
| 5,926,153 | A  * | 7/1999 | Ohishi | G09B 9/32 345/1.1 |
| 2004/0201595 | A1* | 10/2004 | Manchester | G06F 1/1626 345/649 |
| 2005/0007386 | A1* | 1/2005 | Berson | G01C 23/00 345/633 |
| 2009/0066858 | A1* | 3/2009 | Turner | G03B 21/56 348/744 |
| 2015/0331654 | A1* | 11/2015 | Luttrell | G06F 3/1446 345/1.3 |
| 2016/0078592 | A1* | 3/2016 | Kim | G09G 3/00 345/619 |
| 2018/0088455 | A1* | 3/2018 | Cippant | G03B 21/62 |
| 2018/0121153 | A1* | 5/2018 | Lee | G06F 3/1446 |
| 2018/0322683 | A1* | 11/2018 | Dimitrov | G06T 15/005 |

* cited by examiner

*Primary Examiner* — Sanjiv D. Patel
(74) *Attorney, Agent, or Firm* — Suiter Swantz pc llo

(57) ABSTRACT

A polyhedral display system is disclosed. The polyhedral display system may include three or more flat-panel displays shaped as polygons and connected to form a non-planar polyhedral display surface. Further, at least one of the three or more flat-panel displays may be shaped as a non-rectangular polygon. The polyhedral display system may further include a controller coupled to the flat-panel displays. The controller may receive visual content, divide the visual content into three or more segments for display on the three or more flat-panel displays based on their relative positions, and provide data signals to the three or more flat-panel displays based on the three or more segments for displaying the visual content.

20 Claims, 4 Drawing Sheets

POLYHEDRAL DISPLAY DEVICE USING SHAPED FLAT-PANEL DISPLAYS

BACKGROUND

Immersive displays typically include a display surface that is larger than a field of view of a user such that the user may view different portions of displayed image or video content by turning his or her head. In some cases, the display surface is shaped to at least partially surround the user to provide increasingly immersive experiences. Immersive displays have many potential uses including, but not limited to, recreational displays, immersive gaming platforms, simulators for aircraft or automotive applications, and real-time displays in place of transparent windows in supersonic or hypersonic aircraft where windows may be undesirable or infeasible.

Immersive displays may typically include a system for projecting images onto a display surface, in part due to challenges associated with creating seamless arbitrarily-shaped display surfaces using flat-panel displays that have been traditionally fabricated in rectangular shapes. However, projection systems may impose requirements on system size or weight that may limit their effective implementation or reliability in some applications.

SUMMARY

In one aspect, embodiments of the inventive concepts disclosed herein are directed to a polyhedral display system. The polyhedral display system may include three or more flat-panel displays connected to form a non-planar polyhedral display surface. For example, each of the three or more flat-panel displays are shaped as polygons. Further, at least one of the three or more flat-panel displays is shaped as a non-rectangular polygon. The polyhedral display system may further include a controller coupled to the three or more flat panel displays. The controller may receive visual content, divide the visual content into three or more segments for display on the flat-panel displays based on their relative positions along the polyhedral display surface, and provide data signals to the three or more flat-panel displays such that the visual content may span the polyhedral display surface.

In a further aspect, embodiments of the inventive concepts disclosed herein are directed to a polyhedral display including three or more flat-panel displays connected to form a geodesic display surface in which each of the flat-panel displays are shaped as triangles. The geodesic display surface may further form a convex hull, where display elements of the three or more flat-panel displays are located on an interior surface of the at least a portion of the convex hull.

In a further aspect, embodiments of the inventive concepts disclosed herein are directed to a method for displaying non-planar visual content. The method may include receiving visual content for display. The method may further include dividing the visual content into three or more segments for display on a non-planar polyhedral display surface. For example, a non-planar polyhedral display surface may include three or more flat-panel displays shaped as polygons, where at least one of the three or more flat-panel displays is shaped as a non-rectangular polygon. Further, the three or more segments may be generated based on the relative positions of the three or more flat-panel displays along the polyhedral display surface. The method may further include adjusting the visual content in the three or more segments based on the relative positions of the three or more flat-panel displays to emulate a curved screen. For example, a curved screen may correspond to a curved surface bounded by vertices of the polyhedral display surface. The method may further include displaying the visual content based on the three or more segments.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
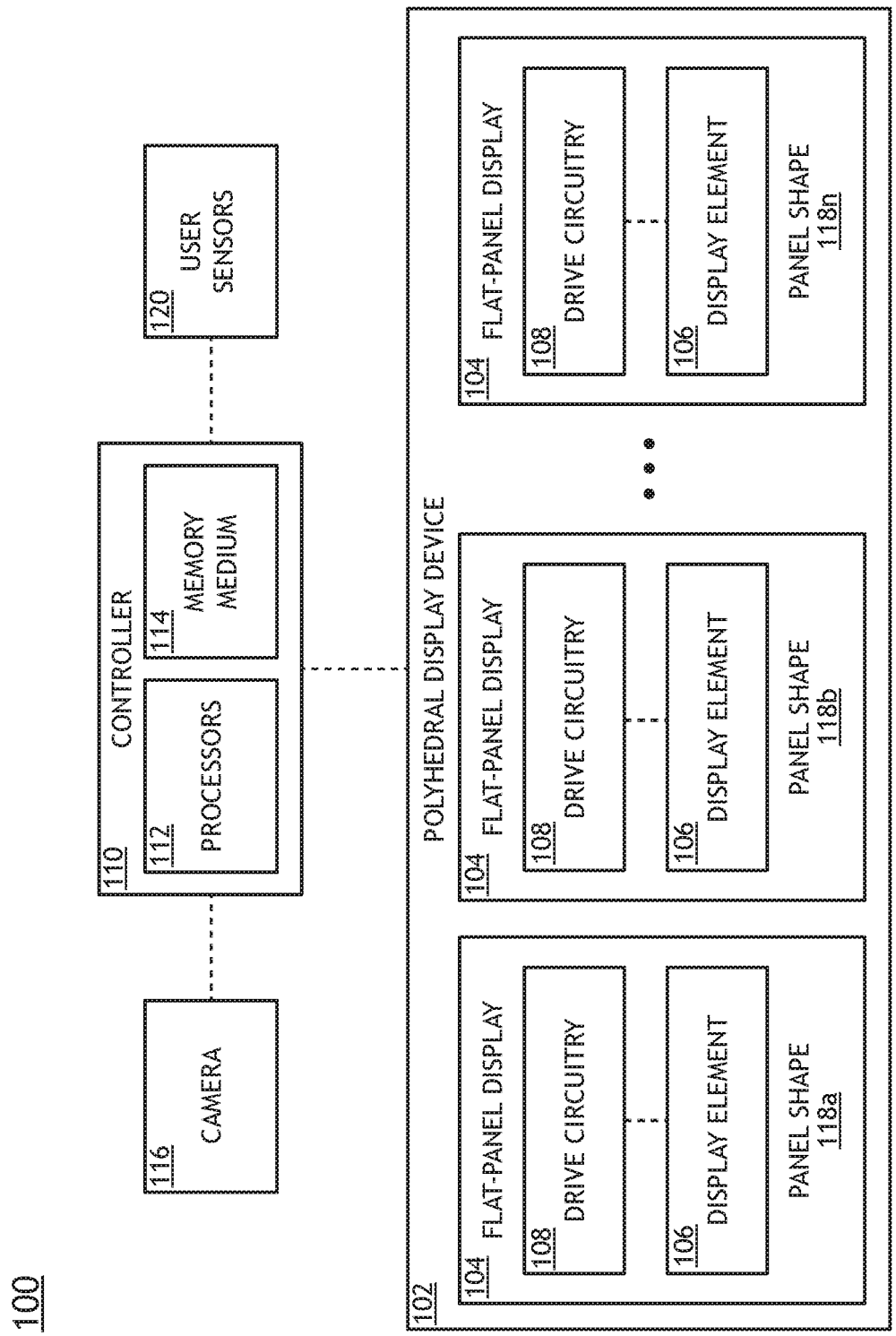
FIG. 1 is a conceptual view of an exemplary embodiment of a polyhedral display system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments in accordance with inventive concepts herein are directed to an immersive polyhedral display system including multiple flat-panel displays shaped as various polygons that may be arranged to form a display surface with any selected profile. In some embodiments, the flat panel displays are arranged in the shape of a polyhedron (or a portion thereof), where display surfaces (e.g., screens) of the flat-panel displays form an interior surface of the polyhedron. In this regard, one or more users located in an interior cavity of the polyhedral display device may view image or video content on the multiple flat-panel displays. Further, the polyhedral display device may have a viewing area larger than the field of view of a user such that the user may feel immersed in the display and may selectively view portions of the image or video content by turning his or her head. For the purposes of the present disclosure, it is to be understood that references to a user or multiple users are provided for illustrative purposes and should not be interpreted as limiting. Rather, the polyhedral display system may be suitable for any number of users without departing from the spirit or scope of the present disclosure. In this regard, references to a user and multiple users (e.g., one or more users) are used interchangeably.

The polyhedral display system may have any three-dimensional shape with polygonal faces formed from flat-panel displays. In this regard, the polyhedral display system may approximate any curved surface, where the accuracy of the approximation typically increases with increasing numbers of faces. For example, the polyhedral display system may approximate a dome in which a user may view the display surfaces from an interior portion of the dome. By way of another example, the polyhedral display system may approximate a sphere to provide a 360-degree viewing experience. In this regard, a user may view the display surface from within the sphere (e.g., on a platform or in a chair). By way of a further example, the polyhedral display device may conform to any shape such as, but not limited to, a canopy of an aircraft or an interior of an automobile. In this regard, the polyhedral display device may provide a real-time display to a user (e.g., a pilot) in situations where a transparent (e.g., windowed) canopy is undesirable or infeasible.

The flat-panel displays may be shaped as any type of polygon such as, but not limited to, triangles, squares, rectangles, pentagons, or hexagons. Further, the polyhedral display system may include flat-panel displays having multiple polygonal shapes suitable for forming a desired surface profile.

The polyhedral display system may include circuitry to adjust how content (e.g., images and/or video) is displayed on one or more flat-panel displays. In some embodiments, the polyhedral display device incorporates image warping circuitry to adjust image and/or video content on any of the flat-panel displays to compensate for perceived distortions or discontinuities associated with the layout of the flat-panel displays.

In some embodiments, the polyhedral display system includes user tracking to monitor characteristics such as, but not limited to, a user location, head location, head orientation, and/or a gaze direction of a user. In this regard, one or more visual elements may be displayed based on the user tracking data.

Referring now to FIG. 1, a conceptual view of an exemplary embodiment of a polyhedral display system 100 is shown. In some embodiments, the polyhedral display system 100 includes a polyhedral display surface 102. The polyhedral display surface 102 many include any number of flat-panel displays 104 shaped as polygons and arranged in any pattern. For example, the polyhedral display surface 102 may include flat-panel displays 104 arranged in the shape of at least a portion of a polyhedron of any type. Further, each of the flat-panel displays 104 may include a display element 106 (e.g., a screen) and drive circuitry 108 suitable for driving the display element 106. For the example, the drive circuitry 108 may include circuitry for rendering image and/or video content on pixels of the display element 106.

In some embodiments, the polyhedral display system 100 includes a controller 110 including one or more processors 112 configured to execute program instructions maintained on a memory medium 114. In this regard, the one or more processors 112 of controller 110 may execute any of the various process steps described throughout the present disclosure. For example, the processors 112 may generate content signals for each of the flat-panel displays 104 based on the known positions of each of the flat-panel displays 104 to provide continuous image and/or video content spanning the multiple flat-panel displays 104.

The one or more processors 112 of a controller 110 may include any processing element known in the art. In this sense, the one or more processors 112 may include any microprocessor-type device configured to execute algorithms and/or instructions. In one embodiment, the one or more processors 112 may consist of a desktop computer, mainframe computer system, workstation, image computer, parallel processor, or any other computer system (e.g., networked computer) configured to execute a program configured to operate the polyhedral display system 100, as described throughout the present disclosure. It is further recognized that the term "processor" may be broadly defined to encompass any device having one or more processing elements, which execute program instructions from a non-transitory memory medium 114. Further, the steps described throughout the present disclosure may be carried out by a single controller 110 or, alternatively, multiple controllers. Additionally, the controller 110 may include one or more controllers housed in a common housing or within multiple housings. In this way, any controller or combination of controllers may be separately packaged as a module suitable for integration into polyhedral display system 100.

The memory medium 114 may include any storage medium known in the art suitable for storing program instructions executable by the associated one or more processors 112. For example, the memory medium 114 may include a non-transitory memory medium. By way of another example, the memory medium 114 may include, but is not limited to, a read-only memory ROM), a random-access memory (RAM), a magnetic or optical memory device (e.g., disk), a magnetic tape, or a solid-state drive. It is further noted that memory medium 114 may be housed in a common controller housing with the one or more processors 112. In one embodiment, the memory medium 114 may be located remotely with respect to the physical location of the one or more processors 112 and controller 110. For instance, the one or more processors 112 of controller 110 may access a remote memory (e.g., server), accessible through a network (e.g., internet, intranet, and the like). Therefore, the above description should not be interpreted as a limitation on the present invention but merely an illustration.

The flat-panel displays 104 may display visual content from any source. In some embodiments, the visual content is stored on a memory device (e.g., the memory medium 114) and retrieved for playback. In some embodiments, the polyhedral display system 100 includes one or more cameras 116 to generate the visual content. For example, the polyhedral display surface 102 may display visual content generated by the cameras 116 in real-time.

The flat-panel displays 104 may display content (e.g., image and/or video content) on an interior portion and/or an exterior portion of a polyhedron. In one instance, flat-panel displays 104 may be arranged to provide the display elements 106 facing an interior portion of a polyhedron (or a portion thereof), which may be suitable for providing an immersive display environment that at least partially surrounds a user. In another instance, flat-panel displays 104 may be arranged to provide the display elements 106 facing an exterior portion of a polyhedron (or a portion thereof), which may be suitable for providing a contoured display surface. By way of another example, the polyhedral display surface 102 may include flat-panel displays 104 arranged to approximate any curved surface and having display elements 106 facing any direction. For instance, the flat-panel displays 104 may be arranged to approximate a curved surface corresponding to an aircraft canopy or an interior of any type of vehicle. In this regard, the polyhedral display surface 102 may be installed in an aircraft simulator or an aircraft for which a transparent windowed canopy is undesirable or infeasible such as, but not limited to, supersonic and hypersonic aircraft.

A flat-panel display 104 may incorporate any technology known in the art suitable for providing a display element 106 having a desired polygonal shape (e.g., a triangle, a rectangle, a square, a pentagon, or a hexagon). For example, chip-on-glass manufacturing techniques in which driver circuitry is mounted directly to display glass may facilitate the fabrication of arbitrarily-shaped display elements 106 and may further reduce or, in some cases, eliminate bezels from one or more edges. It is recognized herein that multiple types of display technologies may be suitable for forming polygonal display elements 106 such as, but not limited to, liquid crystal displays (LCDs), light-emitting diode (LED) displays (e.g., micro LED displays), LED-backlit LCD displays, or organic light-emitting diode (OLED) displays. It is further recognized herein that reducing bezel size on one or more edges of the display (e.g., with chip-on-glass manufacturing) may reduce visual transitions between adjacent flat-panel displays 104 in which content is not displayed.

The flat-panel displays 104 may further display visual content at any resolution. Accordingly, each display element 106 may have any number and density of pixels. In this regard, the display elements 106 may be, but is not required to be, characterized by any resolution descriptor such as, but not limited to, high-definition, 4K, or 8K.

The polyhedral display surface 102 may further include multiple shapes of flat-panel displays 104 arranged together to form a display surface having a desired profile. For example, as illustrated in FIG. 1, a polyhedral display surface 102 may include one or more flat-panel displays 104 having a first panel shape 118a, one or more flat-panel displays 104 having a second panel shape 118b, and so on for any number of panel shapes (e.g. up to panel shape 118n).

The polyhedral display surface 102 may include flat-panel displays 104 arranged into any profile. Further, it is recognized herein that any curved surface may be approximated by a series of polygonally-shaped flat-panel displays 104. For example, flat-panel displays 104 of the polyhedral display surface 102 may form, but are not required to form, a convex hull. In this regard, the display elements 106 on an interior portion of the convex hull may provide a continuous display surface with readily-visible display elements 106 that may at least partially surround a user.

In some embodiments, the polyhedral display surface 102 is formed as a polyhedron (or a portion thereof) of any type with any number of faces. For example, the polyhedral display surface 102 may include at least a portion of a tetrahedron, an octahedron, a dodecahedron, or an icosahedron.

In some embodiments, the polyhedral display surface 102 is formed as a geodesic structure in which the faces (e.g., the flat-panel displays 104) are shaped as triangles having different sizes and/or characteristics. For example, the polyhedral display surface 102 may be formed as a geodesic polyhedron that approximates a sphere or a portion thereof (e.g., a dome). A geodesic polyhedron may have multiple types of symmetry such as tetrahedral symmetry (with a base of a tetrahedron having 3 triangular faces), octahedral symmetry (with a base as an octahedron having 8 triangular faces), or icosahedral symmetry (with a base as an icosahedron having 20 triangular faces). A number of faces of a geodesic polyhedra may be further increased for any base structure by subdividing the faces of the base structure into smaller triangles and then projecting the vertices out to the surface of a sphere. A frequency value (sometimes depicted as a V) may indicate a number of subdivided triangles per side. For example, a 2V geodesic polyhedron may be formed from any base structure by subdividing the sides of each face by 2 and connecting the associated vertices to form 4 triangles, a 3V geodesic polyhedral may be formed from any base structure by subdividing the sides of each face by 3 and connecting the associated vertices to form 9 triangles, and so on. In this regard, increasing the frequency value to increase the number of faces may better approximate a surface of a sphere.

Figure 2A:
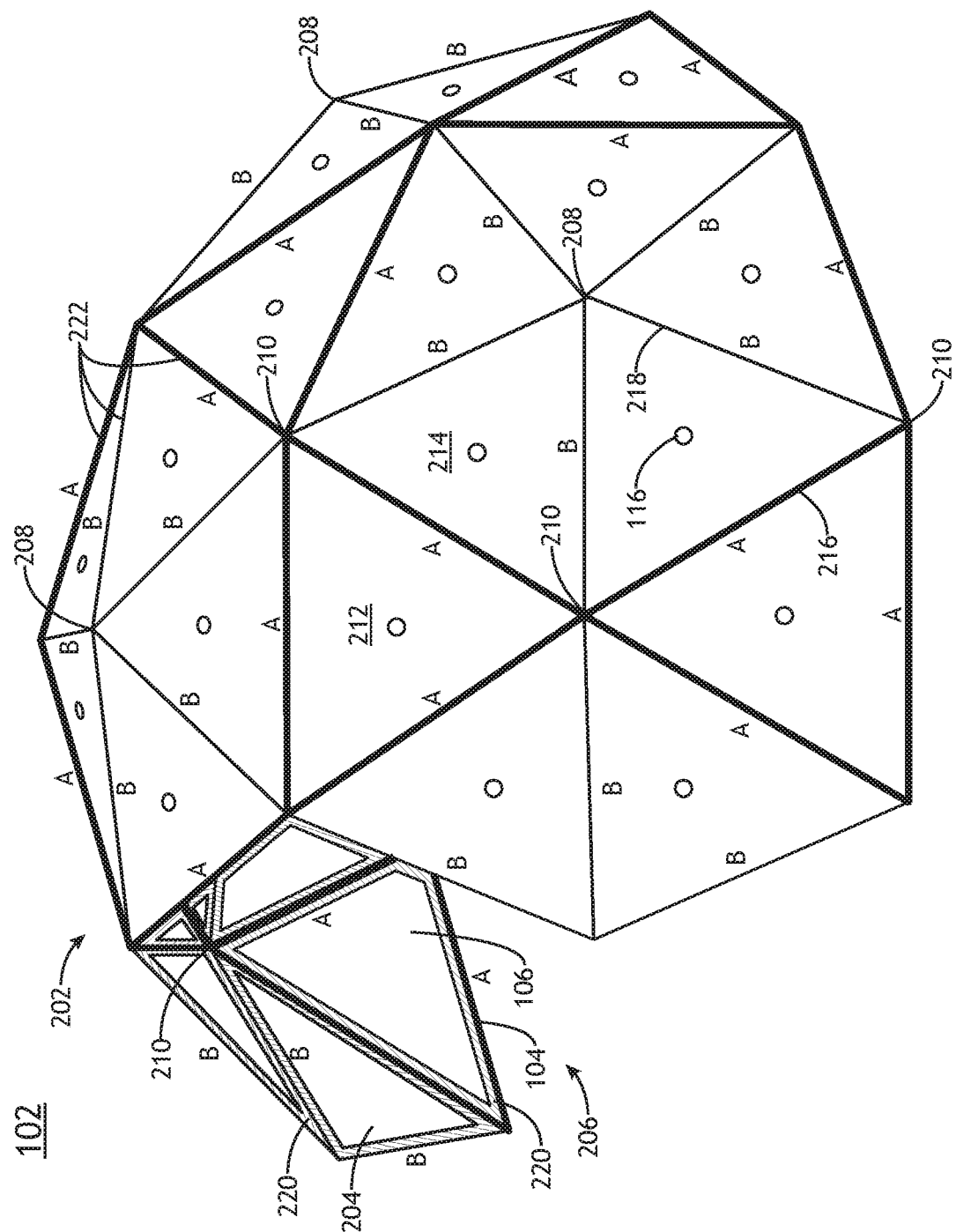
FIG. 2A is a conceptual view of a geodesic display surface formed as a portion of a geodesic polyhedron with a frequency value of two as an exemplary embodiment of a polyhedral display surface according to the inventive concepts disclosed herein.

FIG. 2A is a conceptual view of a geodesic display surface 202 formed as a portion of a geodesic polyhedron with a frequency value of two (e.g., 2V) as an exemplary embodiment of a polyhedral display surface 102. In some embodiments, as illustrated in FIG. 2A, the geodesic display surface 202 includes triangular flat-panel displays 104 arranged to form a portion of a dome that approximates a half sphere, where the display elements 106 of the flat-panel displays 104 are located on an interior surface 204 of the polyhedral display surface 102. In this regard, the display elements 106 may at least partially surround a user located within an interior cavity 206 of the polyhedral display surface 102.

As described previously herein, a geodesic polyhedron may be formed with various types of symmetry (e.g., tetrahedral, octahedral, or icosahedral) based on the underlying base structure. The geodesic display surface 202 of FIG. 2A includes a portion of a 2V geodesic polyhedron having icosahedral symmetry. A complete 2V geodesic polyhedron having icosahedral symmetry may be generally characterized as having a first set 208 of 12 vertices with five intersecting triangles and a second set 210 of vertices (e.g., the remainder of vertices) having six intersecting triangles. Further, the total number of vertices as well as the total number of faces may be determined by the frequency value. For example, a complete 2V geodesic polyhedron having icosahedral symmetry has 80 faces, and the geodesic display surface 202 has 34 flat-panel displays 104 as faces forming a portion thereof.

Figure 2B:
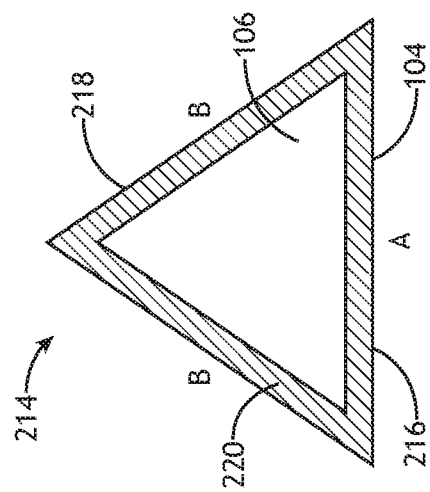
FIG. 2B includes top views of a first panel shape and a second panel shape as exemplary views of panel shapes forming a polyhedral display surface according to the inventive concepts disclosed herein.
Figure 2B:
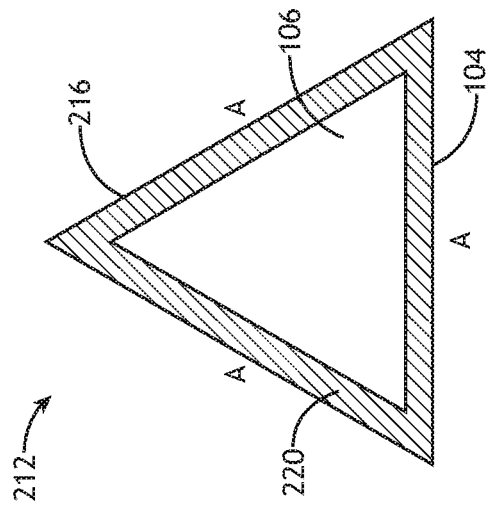

The number of different panel shapes 118 for flat-panel displays 104 required to generate a geodesic polyhedron may depend on the frequency value. For example, the geodesic display surface 202 based on a geodesic polyhedron with a frequency value of two requires two panel shapes 118. FIG. 2B includes top views of a first panel shape 212 and a second panel shape 214 as exemplary views of panel shapes 118 forming a polyhedral display surface 102. For example, the first panel shape 212 may be formed as an equilateral triangle with edges having a first edge length 216 (labeled "A" in FIG. 2B). By way of another example, the second panel shape 214 may be formed as an isosceles triangle having one edge with the first edge length 216 and two edges having a second edge length 218 (labeled "B" in FIG. 2B), where the ratio between the first edge length 216 and the second edge length 218 is approximately 1.131:1.

Further, the arrangement of the flat-panel displays 104 having the first panel shape 212 and the second panel shape 214 for the geodesic display surface 202 is illustrated in FIG. 2A. For example, the first set 208 of vertices include five flat-panel displays 104 having the second panel shape 214 arranged with the "A" edges intersecting the first set 208 of vertices. The remainder of the flat-panel displays 104 have the first panel shape 212.

The flat-panel displays 104 of the geodesic display surface 202 may include triangular display elements 106 surrounded by bezels 220 with any thickness. For example, the bezels 220 may be, but are not required to be, less than approximately ⅛ inches. It is recognized herein that bezels 220 typically provide areas on which no content may displayed such that reducing bezel thickness typically improves a viewing experience of a user by providing an increasingly seamless display surface. However, it may be the case that the degree to which bezels 220 are visible to the user may depend on the size of the polyhedral display system 100 and/or the distance between the user and the flat-panel displays 104. In this regard, the thicknesses of bezels 220 may vary without departing from the spirit and scope of the present disclosure.

In some embodiments, the flat-panel displays 104 include bezels 220 with a uniform thickness on all sides of the display elements 106. In this regard, regions between adjacent display elements 106 where no content is displayed may be uniform across the display surface of the geodesic display surface 202. In some embodiments, at least some of the flat-panel displays 104 have non-uniform bezels. For example, certain display technologies may require one or more edges of a display element 106 to have larger bezels 220 than one or more other edges. By way of another example, certain display technologies may allow for a portion of the display element 106 to fold to reduce a required bezel thickness. However, it may be the case that display elements 106 may not be foldable along all dimensions such that bezels along different directions may have different thicknesses. In one instance, the bezels 220 associated with the "B" edges may be smaller than those associated with the "A" edges. In this regard, the sets of 5 flat-panel displays 104 around the first set 208 of vertices may be closely spaced to provide near-continuous pentagonal display surface. Further, visual content may be, but is not required to be, preferentially displayed on the pentagonal display surfaces. In some embodiments, one or more flat-panel displays 104 are formed from a display technology enabling bezel-less construction or having bezels 220 with thicknesses that are negligible when viewed at a selected distance by a user.

It is to be understood that FIGS. 2A and 2B, as well as the associated descriptions of the geodesic display surface 202, are provided solely for illustrative purposes and should not be interpreted as limiting. For example, the polyhedral display surface 102 may be formed as at least a portion of a geodesic polyhedron having any frequency value. By way of another example, the polyhedral display surface 102 may include a geodesic arrangement of triangular flat-panel displays 104 with any number of panel shapes 118 to form any arbitrary surface profile. In this regard, the polyhedral display surface 102 is not limited to geodesic polyhedrons or portions thereof.

Further, the flat-panel displays 104 are not limited to triangles, but may be shaped as polygons (regular or irregular) having any number of sides. In some embodiments, the polyhedral display surface 102 is formed as a Goldberg polyhedron that approximates a sphere, or a portion thereof, in which the faces (e.g., the flat-panel displays 104) are typically shaped as hexagons or pentagons, though some may have some triangle or square faces. Goldberg polyhedrons, like geodesic polyhedrons, may be formed with various types of symmetry such as, but not limited to, tetrahedral symmetry, octahedral symmetry, or icosahedral symmetry. For example, the polyhedral display surface 102 may be formed as a truncated icosahedron (e.g., a shape on which American soccer balls are based), or a portion thereof, having a combination of pentagonal and hexagonal flat-panel displays 104 as faces. By way of another example, the polyhedral display surface 102 may include flat-panel displays 104 having any combination of polygonal shapes to provide an arbitrary surface profile.

The polyhedral display system 100 may include, but is not required to include, one or more framing elements 222 to structurally support the flat-panel displays 104. The framing elements 222 may be formed from any material such as, but not limited to, wood, a metal, or a metal alloy. In some embodiments, framing elements 222 are formed in a polyhedral shape that is the same as or substantially similar to the polyhedral display surface 102. In this regard, the flat-panel displays 104 may have the same shapes and layout as faces of a polyhedral structure (e.g., a geodesic structure, a Goldberg polyhedron, or an arbitrary polyhedral structure) formed by the framing elements 222. For example, as illustrated in FIG. 2A, the framing elements 222 may form a wireframe structural support corresponding to the edges of the polyhedral display surface 102. Further, though not shown, the framing elements 222 may include additional elements such as, but not limited to, solid material corresponding to faces of the polyhedral display surface 102 or an outer shell. Accordingly, the flat-panel displays 104 may be mounted to framing elements 222 that form a wireframe of a polyhedral structure or on framing elements 222 that form faces of a polyhedral structure and/or the outer shell. In some embodiments, the framing elements 222 have a different geometry than the polyhedral display surface 102. For example, the polyhedral display surface 102 may include a dome or a sphere constructed using any method suitable for supporting the polyhedral display surface 102.

The polyhedral display system 100 may at least partially surround a user. In this regard, the display elements 106 may occupy a space larger than a field of view of a user located at a selected viewing spot such that the user may selectively view different portions of displayed content by moving his or her head. For example, a polyhedral display system 100 may be shaped to include an interior cavity (e.g., the interior cavity 206 of FIG. 2A) in which one or more users may go to view displayed content (e.g., on the interior surface 204 of FIG. 2A).

In some embodiments, as illustrated in FIG. 2A, at least a portion of the polyhedral display system 100 is open to provide access for a user to enter and/or exit. In some embodiments, though not shown, one or more flat-panel displays 104 may be removable such that they may provide a closeable entry and/or exit point for users. In this regard, the one or more flat-panel displays 104 may operate as a door that may provide display elements 106 facing the interior cavity when closed. Further, the one or more flat-panel displays 104 operating as a door may open and close using any method known in the art such as, but not limited to hinges attached to adjacent flat-panel displays 104 and/or framing elements 222.

In some embodiments, the polyhedral display surface 102 fully surrounds one or more users. For example, the polyhedral display surface 102 (e.g., having one or more flat-panel displays 104 as a door) may form a closed structure that extends to the ground. Further, the ground may include either land or a flooring structure. For instance, the polyhedral display surface 102 may be formed as a polyhedral structure approximating a dome (e.g., a portion of a sphere) or any partial polyhedron. By way of another example, the polyhedral display surface 102 may be formed as a complete polyhedron such that display elements 106 are visible in all or nearly all directions. For instance, the polyhedral structure polyhedral display surface 102 may approximate a complete sphere. For example, the polyhedral display system 100 may include support structures suitable for securing users such as, but not limited to chairs or walkways within the interior of the polyhedral display surface 102.

In some embodiments, the geodesic display surface 202 includes one or more cameras 116 to generate visual content for display on the flat-panel displays 104. The cameras 116 may be located at any location with respect to the flat-panel displays 104. For example, as illustrated in FIG. 2A, cameras 116 may be mounted to a back side of any number of flat-panel displays 104. Accordingly, the polyhedral display system 100 flat-panel displays 104 may operate as a "see-through" display in which visual content generated on cameras on the backsides of the polyhedral display surface 102 may be displayed on the display elements 106 located on an interior portion of the polyhedral display surface 102. In some embodiments, the polyhedral display system 100 may display visual content generated by an external source including, but not limited to, external cameras or computer-generated content.

In some embodiments, the controller 110 includes circuitry to distribute visual content (e.g., image and/or video content) to the flat-panel displays 104. For example, the controller 110 may segment visual content based on a known arrangement of flat-panel displays 104 and generate corresponding data signals to the flat-panel displays 104. In this regard, the display elements 106 may form a continuous display surface for the display of the visual content.

In some embodiments, the polyhedral display system 100 (e.g., within the controller 110 and/or the drive circuitry 108 of individual flat-panel displays 104) may include circuitry to adjust visual content based on the physical design of the polyhedral display surface 102. In this regard, the visual content may be tailored to the polyhedral display surface 102. For example, the polyhedral display system 100 may include circuitry to compensate for the presence of bezels (e.g., bezels 220) between adjacent display elements 106. In one instance, portions of source visual content that would otherwise be displayed in the locations of the bezels are cropped to reduce distortions in the composite display surface formed from the display elements 106. By way of another example, the polyhedral display system 100 may include circuitry to adjust (e.g., warp) portions of the visual content to emulate a smooth display surface. It may be the case that the intersections of the flat-panel displays 104 at vertices of a polyhedral structure may result in distortions when viewed by a user. Accordingly, imaging warping circuitry may adjust (e.g., compress or expand) the visual content to compensate for the distortions by adjusting perceived locations of pixels of the visual content. In one instance, the imaging warping circuitry may adjust portions of the visual content to emulate a smooth surface bounded by the vertices of the polyhedral display surface 102 (e.g., the first set 208 of vertices and the second set 210 of FIG. 2A).

In some embodiments, the polyhedral display system 100 provides 3D visual content to users. Further, the polyhedral display system 100 may utilize any technology known in the art suitable for providing 3D effects. For example, the display elements 106 are shaped to provide stereoscopic image content in which visual content for the left and right eyes is differentiated by the physical characteristics of the display elements 106. By way of another example, the display elements 106 may provide 3D content when coupled with glasses or visual aids in which visual content for the left and right eyes are differentiated by methods such as, but not limited to, polarization, active shuttering, or interference filters. By way of another example, the display elements 106 may provide 3D content by providing three-dimensional visual content through the use of any technology known in the art such as, but not limited to, volumetric displays or holographic displays.

In some embodiments, the polyhedral display system 100 includes one or more speakers to play audio content to one or more users. For example, the polyhedral display system 100 may include one or more speakers to play common audio content to one or more users. By way of another example, the polyhedral display system 100 may include an audio distribution system for providing individualized audio content to one or more users. For example, the polyhedral display system 100 may distribute individualized audio content to personal audio devices (e.g., headphones or earbuds) worn by one or more users. Further, the polyhedral display system 100 may distribute audio content using any technology known in the art such as, but not limited to, Bluetooth, Bluetooth Low Energy, or WiFi standards.

In some embodiments, the polyhedral display system 100 includes one or more user sensors 120 suitable for tracking the location, orientation and/or motion of a user. The user sensors 120 may include any combination of sensors known in the art for tracking a user such as, but not limited to, head-tracking sensors for tracking head location and/or orientation, eye-tracking sensors for tracking gaze direction, position sensors to track the location of a user with respect to the polyhedral display surface 102, or body sensors to track one or more aspects of body position. Accordingly, the polyhedral display system 100 may adjust aspects of audio and/or visual content based on user tracking data (e.g., user location, head orientation, head position, or gaze direction data).

For example, the polyhedral display system 100 may adjust the perspective of displayed content based on the motion of a user. In this regard, a user may interact with the visual content in manners such as, but not limited to, looking around objects by walking or turning his or her head, or modifying the perspective of the visual content to view portions of visual content blocked by bezels or otherwise distorted by the polyhedral display surface 102 in a given position.

By way of another example, the polyhedral display system 100 may display selected content at a fixed position in a user field of view regardless of head orientation. The selected content may thus be, but is not required to be, characterized as heads-up display content. For instance, certain display panels of a simulator may be provided as heads-up content that is always visible in a fixed portion of a user's field of view.

By way of another example, the polyhedral display system 100 may define one or more zones associated with a composite display surface provided by the display elements 106 and may further display visual content in the zones based on user tracking data. In one instance, zones may be associated with pentagonal display regions associated with five display elements 106 around each of the first set 208 of vertices of the geodesic display surface 202 in FIG. 2A.

Figure 3:
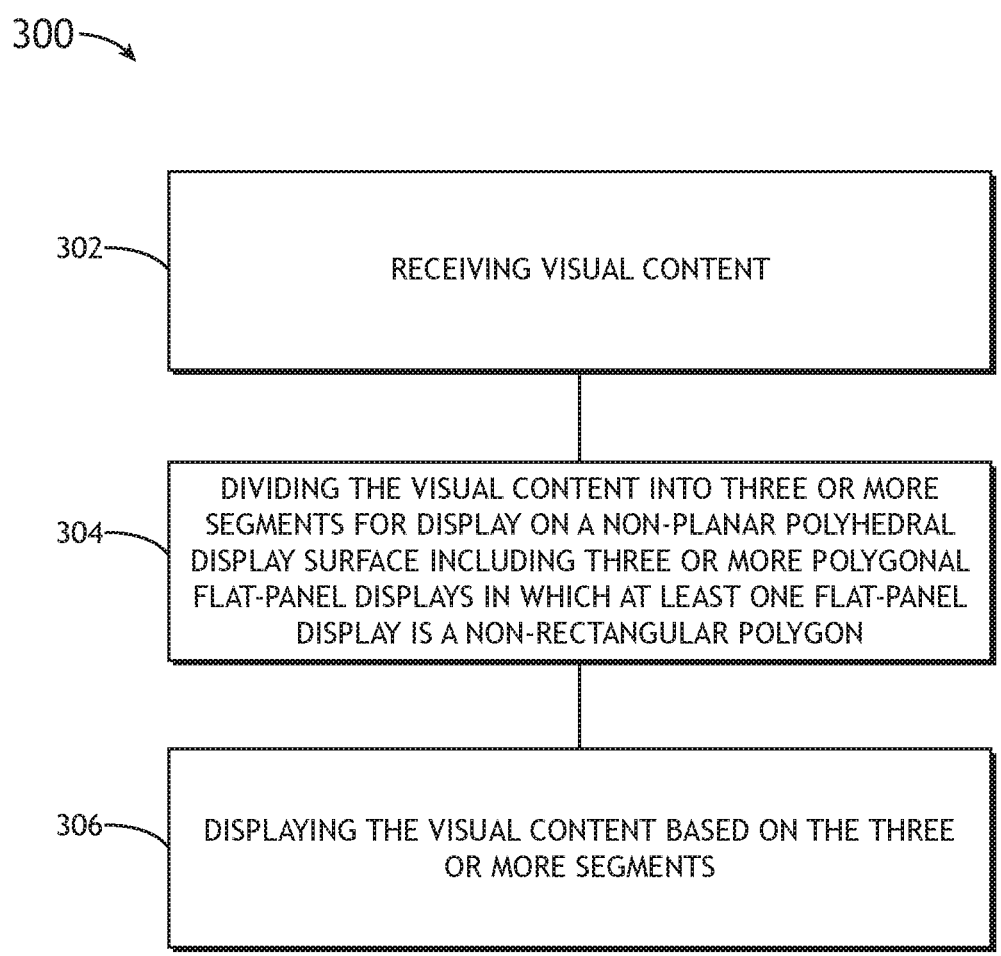
FIG. 3 is a flow chart illustrating a method to provide visual content spanning a polyhedral display surface according to the inventive concepts disclosed herein.

Referring now to FIG. 3, an exemplary embodiment of a method according to the inventive concepts disclosed herein may include one or more of the following steps. The method 300 may be utilized to provide visual content spanning a polyhedral display surface. The embodiments and enabling technologies described previously herein in the context of the polyhedral display system 100 should be interpreted to extend to method 200. However, the method 300 is not limited to the architecture of the polyhedral display system 100.

A step 302 may include receiving visual content. For example, visual content may include any combination of image and video content. A step 304 may include dividing the visual content into three or more segments for display on a non-planar polyhedral display surface including three or more polygonal flat-panel displays in which at least one flat-panel display is a non-rectangular polygon (e.g., a polygon having any number of sides except four). In some embodiments, the polyhedral display surface includes a geodesic surface such as, but not limited to, at least a portion of a geodesic polygon. In this regard, the flat-panel displays may be formed from triangles having one or more different panel shapes. In some embodiments, the polyhedral display surface includes a Goldberg polyhedron formed from pentagonal or hexagonal flat-panel displays.

In some embodiments, the polyhedral display surface has an arbitrary shape formed from polygonal faces. In this regard, a polyhedral display surface formed from polygonal flat-panel displays may approximate any curved surface. For example, the polyhedral display surface may be, but is not required to be, shaped to approximate the form of an airline canopy. In this regard, the polyhedral display surface may be mounted in an aircraft cockpit and/or an aircraft simulator.

In some embodiments, the polyhedral display surface forms a convex hull with display elements of the flat-panel displays (e.g., screens) located on an interior surface of the complex hull. In this regard, the polyhedral display surface may at least partially surround one or more users. For example, the polyhedral display surface may approximate a sphere or a portion thereof (e.g., a dome).

Further, in the step 302, the visual content may be segmented based on the relative positions of the three or more flat-panel displays along the polyhedral display surface. A step 306 may include displaying the visual content based on the three or more segments. In this regard, the flat-panel displays may form a composite display surface and the visual content may span the flat-panel displays.

The method 300 may further include an optional step of adjusting the visual content in the three or more segments based on the relative positions of the three or more flat-panel displays to emulate a curved screen such as, but not limited to, a curved surface bounded by vertices of the polyhedral display surface. In this regard, the visual content may be adjusted to mitigate any distortions associated with the physical layout of the polyhedral display surface.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A polyhedral display system comprising:
    three or more flat-panel displays connected to form a non-planar polyhedral display surface, wherein each of the three or more flat-panel displays are shaped as polygons, wherein at least one of the three or more flat-panel displays is shaped as a non-rectangular polygon; and a controller communicatively coupled to the three or more flat-panel displays, the controller including one or more processors configured to execute program instructions causing the one or more processors to:
  receive visual content;
  divide the visual content into three or more segments for display on the three or more flat-panel displays based on the relative positions of the three or more flat-panel displays;
  adjust the visual content in the three or more segments based on at least one of a number of the three or more flat-panel displays or the relative positions of the three or more flat-panel displays to emulate a curved screen corresponding to a curved surface different than the non-planar polyhedral display surface, wherein the curved surface contains vertices of the polyhedral display surface; and
  provide data signals to the three or more flat-panel displays based on the three or more segments for displaying the visual content.

2. The polyhedral display system of claim 1, wherein the three or more flat-panel displays form at least a portion of a geodesic polyhedron, wherein each of the three or more flat-panel displays are shaped as triangles.

3. The polyhedral display system of claim 2, wherein the geodesic polyhedron has a frequency value of one, wherein the three or more flat-panel displays have a common panel shape.

4. The polyhedral display system of claim 2, wherein the at least a portion of a geodesic polyhedron has a frequency value of at least two, wherein the three or more flat-panel displays include two or more sets of flat-panel displays having two or more panel shapes based on the frequency value.

5. The polyhedral display system of claim 1, wherein the polyhedral display surface forms at least a portion of a convex polyhedron, wherein display elements of the three or more flat-panel displays are disposed on an interior cavity of the at least a portion of the convex polyhedron.

6. The polyhedral display system of claim 5, wherein at least one of the three or more flat-panel displays is removable to allow a user to access the interior cavity.

7. The polyhedral display system of claim 6, wherein the at least a portion of the convex polyhedron comprises a complete polyhedron configured to surround the user.

8. The polyhedral display system of claim 7, further comprising:
  at least one of a chair or a platform to support a user within the interior cavity.

9. The polyhedral display system of claim 1, wherein the three or more flat-panel displays include drive circuitry located on a back side opposite a display surface.

10. The polyhedral display system of claim 1, wherein the one or more processors are further configured to execute program instructions causing the one or more processors to:
  adjust the visual content in the three or more segments based on the relative positions of the three or more flat-panel displays to compensate for bezels of the three or more flat-panel displays.

11. The polyhedral display system of claim 1, further comprising:
  one or more head orientation sensors to determine a head orientation of a user, wherein the one or more processors are further configured to execute program instructions causing the one or more processors to:
    display a selected portion of the visual content at a fixed position with respect to the head orientation of the user received from the one or more head orientation sensors.

12. The polyhedral display system of claim 1, further comprising:
  one or more cameras directed outward from at least one of the three or more flat-panel displays to generate the visual content.

13. The polyhedral display system of claim 1, wherein the three or more flat-panel displays include bezels less than approximately 0.125 inches on at least one edge.

14. The polyhedral display system of claim 1, wherein the three or more flat-panel displays comprise:
  at least one of liquid crystal displays, light-emitting diode displays, or organic light emitting diode displays.

15. The polyhedral display system of claim 12, wherein a shape of the polyhedral display surface corresponds to a shape of a canopy of an aircraft, wherein the polyhedral display surface is located within the canopy of the aircraft, wherein the visual content provided by the one or more cameras corresponds to a view from the canopy of the aircraft.

16. A method for non-planar visual display:
  receiving visual content;
  dividing the visual content into three or more segments for display on a non-planar polyhedral display surface, wherein the polyhedral display surface includes three or more flat-panel displays, wherein each of the three or more flat-panel displays are shaped as polygons, wherein at least one of the three or more flat-panel displays is shaped as a non-rectangular polygon, wherein the three or more segments are based on the relative positions of the three or more flat-panel displays along the polyhedral display surface;
  adjusting the visual content in the three or more segments based on at least one of a number of the three or more flat-panel displays or the relative positions of the three or more flat-panel displays to emulate a curved screen corresponding to a curved surface different than the non-planar polyhedral display surface, wherein the curved surface contains vertices of the polyhedral display surface; and
  displaying the visual content based on the three or more segments.

17. A polyhedral display system comprising:
  three or more flat-panel displays connected to form a non-planar polyhedral display surface, wherein each of the three or more flat-panel displays are shaped as polygons, wherein at least one of the three or more flat-panel displays is shaped as a non-rectangular polygon;
  one or more cameras directed outward from a backside of at least one of the three or more flat-panel displays to generate visual content; and
  a controller communicatively coupled to the three or more flat-panel displays, the controller including one or more processors configured to execute program instructions causing the one or more processors to:
    receive the visual content from the one or more cameras;
    divide the visual content into three or more segments for display on the three or more flat-panel displays based on the relative positions of the three or more flat-panel displays;
    adjust the visual content in the three or more segments based on at least one of a number of the three or more flat-panel displays or the relative positions of the three or more flat-panel displays to emulate a curved screen corresponding to a curved surface different than the non-planar polyhedral display surface, wherein the curved surface contains vertices of the polyhedral display surface; and provide data signals to the three or more flat-panel displays based on the three or more segments for displaying the visual content.

18. The polyhedral display system of claim 17, wherein the one or more processors are further configured to:

adjust the visual content in the three or more segments based on the relative positions of the three or more flat-panel displays to emulate a curved screen corresponding to a curved surface containing vertices of the polyhedral display surface.

19. The polyhedral display system of claim 17, wherein a shape of the polyhedral display surface corresponds to a shape of a canopy of an aircraft, wherein the polyhedral display surface is located within the canopy of the aircraft, wherein the visual content provided by the one or more cameras corresponds to a view from the canopy of the aircraft.

20. The polyhedral display system of claim 17, wherein three or more flat-panel displays are connected to form a geodesic display surface, wherein each of the three or more flat-panel displays are shaped as triangles, wherein the geodesic display surface forms a convex hull, wherein display elements of the three or more flat-panel displays are disposed on an interior surface of the convex hull.

* * * * *